No. 758,774. Patented May 3, 1904.

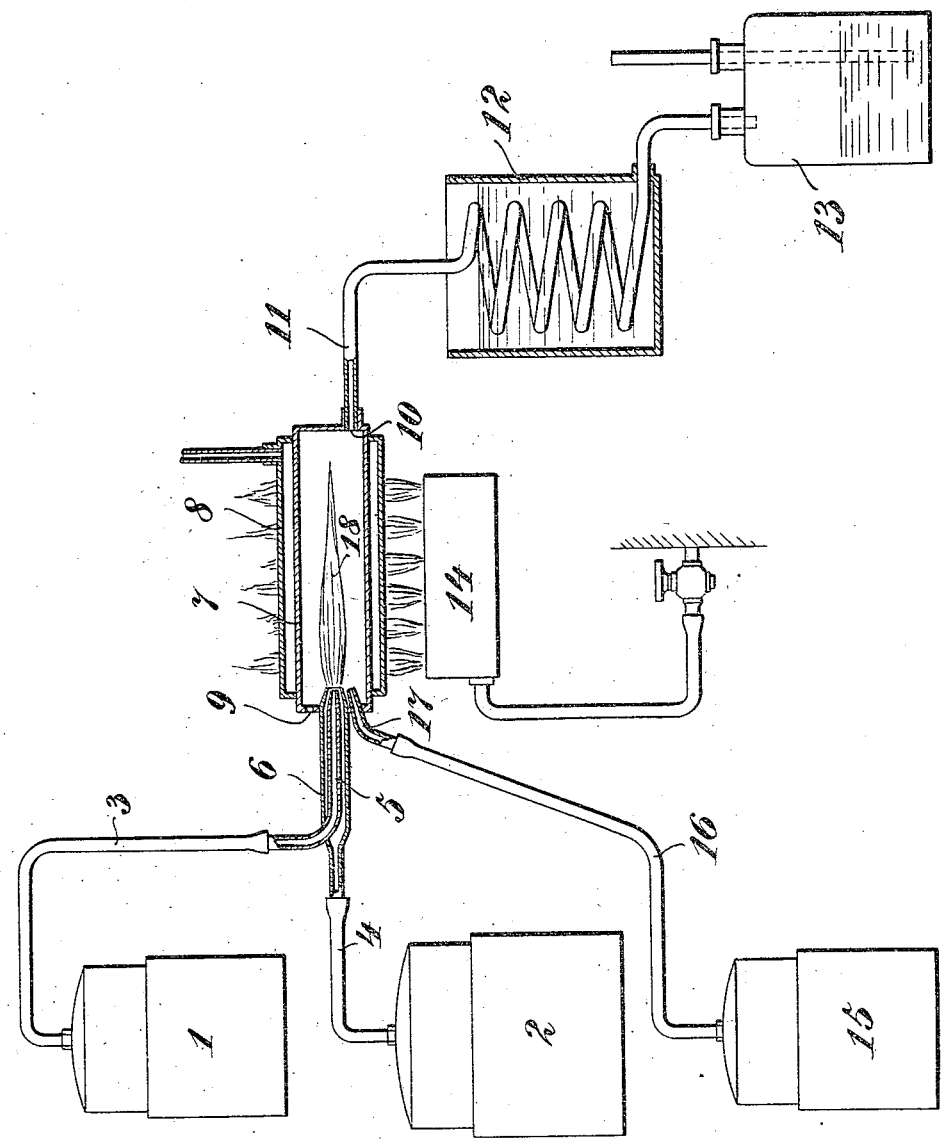

UNITED STATES PATENT OFFICE.

GUIDO PAULING, OF OLBERNHAU, GERMANY.

PROCESS OF MANUFACTURING NITRIC DIOXID AND NITRIC ACID.

SPECIFICATION forming part of Letters Patent No. 758,774, dated May 3, 1904.

Application filed November 1, 1902. Serial No. 129,740. (No specimens.)

*To all whom it may concern:*

Be it known that I, GUIDO PAULING, chemist, a citizen of the Kingdom of Saxony, and a resident of Olbernhau, Saxony, German Empire, have invented certain new and useful Improvements in a new or Improved Process for the Manufacture of Nitric Dioxid and Nitric Acid, of which the following is a specification.

This invention relates to a new or improved process for the manufacture of nitric dioxid and nitric acid from a mixture of air and steam or of air and oxyhydrogen gas. In this process a certain quantity of one or the other mixture is heated until a considerable degree of dissociation of the water has been produced, whereupon the dissociated hydrogen is removed. It is also essential that the removal of said hydrogen can be effected by causing it to combine with a substance which is capable of forming a hydrogen compound at the temperature used. The invention is therefore based on the hitherto unknown fact that a mixture of air and steam or air and oxyhydrogen gas heated to a very high temperature contains hydrogen and nitric dioxid besides uncombined nitrogen, oxygen, and water not dissociated. If a mixture of this kind is allowed to cool, the dissociated hydrogen reduces the nitric dioxid to nitrogen again and forms water, so that the final product is the same as the original mixture. To avoid this regenerative reaction, the hydrogen of the heated mixture, which is not only free in a molecular state, but is in a free atomic state, since it is dissociated, is rendered inactive either by removing it from the mixture or by causing it to combine with another substance—for instance, chlorin—with which it is capable of forming a compound at the high temperature used. The formation of nitric dioxid during the process is explained by the fact that at the moment of the dissociation of the water nascent oxygen at a very high temperature is present, the oxidizing power of which is sufficient to convert the nitrogen into nitric dioxid, owing, first, to its nascent state and, secondly, to its very high temperature, and the nitric dioxid, contrary to the water, is capable of remaining undissociated at the high temperature used.

One method of performing the process consists in conducting a highly-heated mixture of air and steam or air and oxyhydrogen gas through a white-hot thin-walled porous tube of porcelain or other suitable material, whereby the free atomic hydrogen produced by the dissociation of the water escapes through the pores of the incandescent tube, while the remaining undissociated water and the nitric dioxid and the possible excess of nitrogen and oxygen, which cannot pass through the fine pores of the tube owing to the comparatively large size of their molecules, pass out of the end of the tube in the form of a reddish-brown vapor, from which the nitric dioxid is obtained in the known manner or converted into nitric acid. If the temperature and the size of the tube are properly chosen, the quantitative result of the process is proportional to the quantities of steam and air employed. Of course the diffusion of the hydrogen through the walls of the tube can be considerably accelerated by the employment of suitable means—for instance, by means of pressure in the tube or by producing a vacuum round the tube or by using the highest attainable temperatures.

For carrying out the process described any suitable apparatus may be used. A suitable device is shown in the accompanying drawing by way of example. Said drawing represents a side elevation with parts in vertical section.

1 and 2 are gasometers containing oxygen and hydrogen gas, respectively. They are connected, by means of tubes 3 and 4, with an oxyhydrogen-burner consisting of an inner tube 5 and an outer tube 6'. The burner projects into a porous porcelain tube 7, having, say, two inches diameter, said tube being closed at both ends and surrounded by a non-porous porcelain tube 8, having, say, a diameter of four inches. A hole 9 is pierced in the front wall and another hole 10 in the back wall of the tube 7, a tube 11 being fitted into said hole 10, the lower part of said tube passing through a cooling vessel 12 and ending in a liquid-receptacle 13. The tubes 7 and 8 are located in a gas-stove 14. With this arrangement oxygen and hydrogen are blown through the burner into the porous tube 7, this latter being heated up to, say, 1,600° centigrade. The air entering at 9 will mix with the oxyhydrogen, and the mixture will burn and produce red fumes of nitric dioxid mixed with undissociated water and with the possible excess of hydrogen and oxygen, this mixture passing through the cooling-tube 11 into the receptacle 13, while the free atomic hydrogen escapes through the pores of the tube 7. In order to combine the free atomic hydrogen with chlorid, a third gasometer 15 may be provided, said gasometer being connected, by means of a tube 16, with a metal tube 17, projecting into the interior of the tube 7 and directing a slow current of chlorin sidewise against the oxyhydrogen-flame 18, a mixture of nitric and hydrochloric acids being then formed, as stated above.

Instead of removing the hydrogen in the manner described it may be combined with a substance which is capable of forming a hydrogen compound at the temperature stated. Thus, for instance, chlorin may be introduced into the porcelain tube, and this gas will then combine with the hydrogen and hydrochloric acid will be formed. In this case the final product will consist of a mixture of nitric acid and hydrochloric acid, which mixture may either be used as such or may be subjected to further treatment in order to separate its two components.

Instead of oxyhydrogen gas steam may be introduced into the tube 7 with the same effect.

Having now particularly described and ascertained the nature of my said invention and in what manner the same is to be performed, I declare that what I claim is—

1. A process of manufacturing nitric dioxid and nitric acid, consisting in heating a mixture of air and steam until the water has attained a considerable degree of dissociation, removing the dissociated hydrogen through the pores of an incandescent tube, and combining with the same chlorin.

2. A process for the manufacture of nitric dioxid and nitric acid, consisting in heating a mixture of air and steam until the water has attained a considerable degree of dissociation, and then removing the dissociated hydrogen through the pores of an incandescent tube.

In witness whereof I have hereunto set my hand in the presence of two witnesses.

GUIDO PAULING.

Witnesses:
 WOLDEMAR HAUPT,
 WILLIAM MAYNER.